United States Patent
Federico et al.

(10) Patent No.: US 11,295,081 B1
(45) Date of Patent: Apr. 5, 2022

(54) SYSTEMS, METHODS, AND APPARATUSES FOR CONTROLLING OUTPUT LENGTH IN NEURAL MACHINE TRANSLATION

(71) Applicant: Amazon Technologies, Inc., Seattle, WA (US)

(72) Inventors: Marcello Federico, Mountain View, CA (US); Mattia Antonino Di Gangi, Rovereto (IT); Surafel Melaku Lakew, Trento (IT)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/586,293

(22) Filed: Sep. 27, 2019

(51) Int. Cl.
*G06F 40/284* (2020.01)
*G06N 3/08* (2006.01)
*H04L 29/08* (2006.01)
*H04L 67/10* (2022.01)

(52) U.S. Cl.
CPC ............. *G06F 40/284* (2020.01); *G06N 3/08* (2013.01); *H04L 67/10* (2013.01)

(58) Field of Classification Search
None
See application file for complete search history.

(56) References Cited

U.S. PATENT DOCUMENTS

| 2016/0314116 A1* | 10/2016 | Kamatani | G06F 40/216 |
| 2020/0034436 A1* | 1/2020 | Chen | G06F 40/58 |
| 2020/0279021 A1* | 9/2020 | Brandall | G06F 40/58 |

\* cited by examiner

*Primary Examiner* — Stella L. Woo
(74) *Attorney, Agent, or Firm* — Nicholson De Vos Webster & Elliott, LLP

(57) ABSTRACT

Techniques for neural machine translation with a controlled output are described. An exemplary method includes receiving a request to perform a machine language translation of text using a translation model; determining a desired target length of the text; using the translation model to translate the text, the identified translation model including an encoder and decoder portion, the decoder portion in accept as an input into a decoder stack at least an embedding of a token of the text, a position of the token within the text, and an indication of length; and output a result of the machine language translation to a requester.

20 Claims, 11 Drawing Sheets

SYSTEMS, METHODS, AND APPARATUSES FOR CONTROLLING OUTPUT LENGTH IN NEURAL MACHINE TRANSLATION

BACKGROUND

Neural machine translation uses a neural network to predict the likelihood of a sequence of words. The recent advances introduced by neural machine translation (neural machine translation) are rapidly expanding the application fields of machine translation, as well as reshaping the quality level to be targeted.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for neural machine translation. According to some embodiments, the neural machine translation utilizes s model that uses an indication of a desired length of the translation to be performed in performing the translation.

While translation quality is normally measured in terms of a correct transfer of meaning and of fluency, there are several applications of neural machine translation that would benefit from optimizing the output length, such as the translation of document elements that have to fit a given layout—e.g. entries of tables or bullet points of a presentation—or subtitles, which have to fit visual constraints and readability goals, as well as speech dubbing, for which the length of the translation should be as close as possible to the length of the original sentence.

Detailed herein are embodiments directed toward controlling the output length in a neural machine translation. In particular, multiple approaches will be detailed for biasing the output length within a neural network (e.g., a transformer architecture) by: i) conditioning the output to a given target-source length-ratio class; ii) enriching the transformer positional embedding with length information; or iii) a combination of i and ii. Experiments show that both can induce the network to generate shorter translations, as well as acquiring interpretable linguistic skills.

Figure 1:
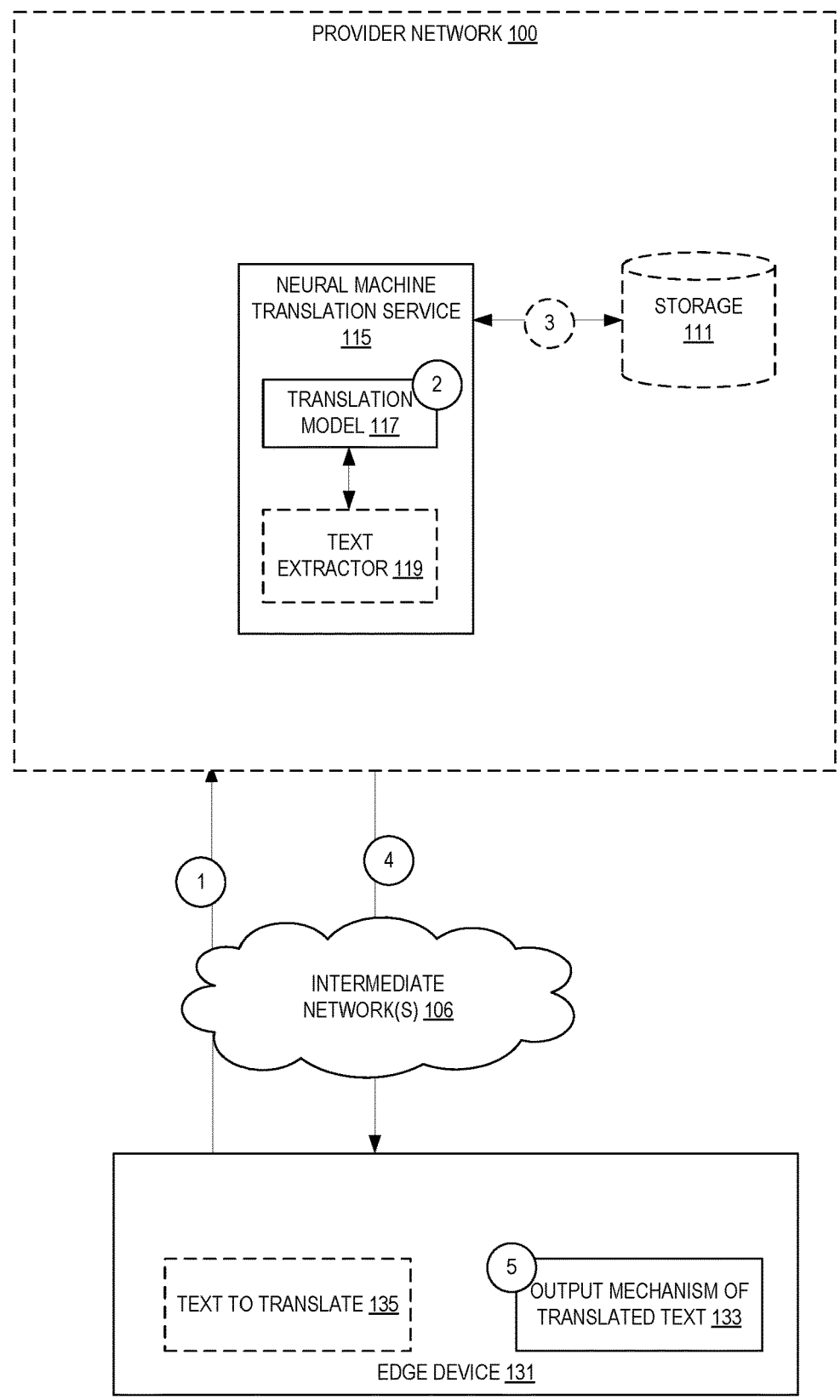
FIG. 1 illustrates embodiments of neural machine translation that controls an output length.

FIG. 1 illustrates embodiments of neural machine translation that controls an output length. In this particular illustration, a neural network-based machine learning translation model 117 of a neural machine translation service 115 produces translations that have controlled output length. In some embodiments, the translation model 117 is stored in storage 11 and instantiated within the neural machine translation service 115.

In some embodiments, the translation model 117 is a transformer-based model. Further, how the translation model 117 has been trained differs depending on the embodiment. In some embodiments, the translation model 117 has been trained using a plurality of training sentence pairs according to target/source length ratios (at training the ratio is observed and at inference the ratio is desired). In particular, a length token is prepended to the source such that the network of the translation model 117 is trained to discriminate between the groups. During inference the length token is provided along with the text to be translated.

In some embodiments, the translation model 117 utilizes length encoding during training. The length encoding may come in different flavors including an absolute encoding and a relative encoding. Absolute encoding encodes the remaining length of a sentence from a given token (e.g., word) and relative encoding encodes the relative position of a given token to the end of the sentence. Both absolute and relative encoding are character based. During training, the length is the observed length of the target sentence, while at inference time it is the length of the source sentence, as it is the length to match. For inference, the absolute or relative length embeddings are provided.

In some embodiments, both approaches to training the translation model 117 are utilized and for inference the positional encoding includes either an absolute or a relative length embedding.

The translation model 117 may get the text to translate from several sources including, but not limited to: closed captioning in a video file (which may also be annotated for length), extracted text from an audio or video file (for example, text extractor 119 performs automatic speech recognition on the audio portion of these types of files), dynamically input text, text from a file or location, etc. Additionally, in some embodiments, the source text is stored in storage 111 and/or the output of the translation is stored in storage 111.

As shown, the neural machine translation service 115 is hosted in a provider network 100 in some embodiments. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) 104 may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

An edge device 131 may provide text to translate 135, a request to perform a translation, and a means to output the translated text 133 (such as display, output audio, etc.). A request to have text translated may include one or more of: a source language, a source language dialect, a target language, a target language dialect. a desired length (e.g., in cases where the translation should not be consistent with the source text length), a source of text to translate (this may include text based documents such as word processing, presentation, etc. documents, audio and/or video files, etc.), a source location of text to translate, a destination for the translation, an indication of a translation model to use, etc.

FIG. 1 includes circles with numbers inside which represent an exemplary flow. At circle 1, the edge device makes a request for a translation with controlled output length. Examples of what that request may include have been detailed above.

The neural machine translation service 115 uses a translation model 117 to make that translation according to the request at circle 2. In some embodiments, to make that translation the neural machine translation service 115 retrieves the text to translate from storage 111 at circle 3. This is not needed if the text was provided as a part of the request in circle 1.

The result of the translation is sent back to the edge device at circle 4. Note the translation may also be stored in storage 111. For example, if the translation was for a public facing content (such as a movie of a content provider), that translation may be stored along with the original content so that a subsequent translation would not need to be made.

At circle 5, the translated text is output. For example, the translation is displayed, an audio version is played, etc.

Figure 2:
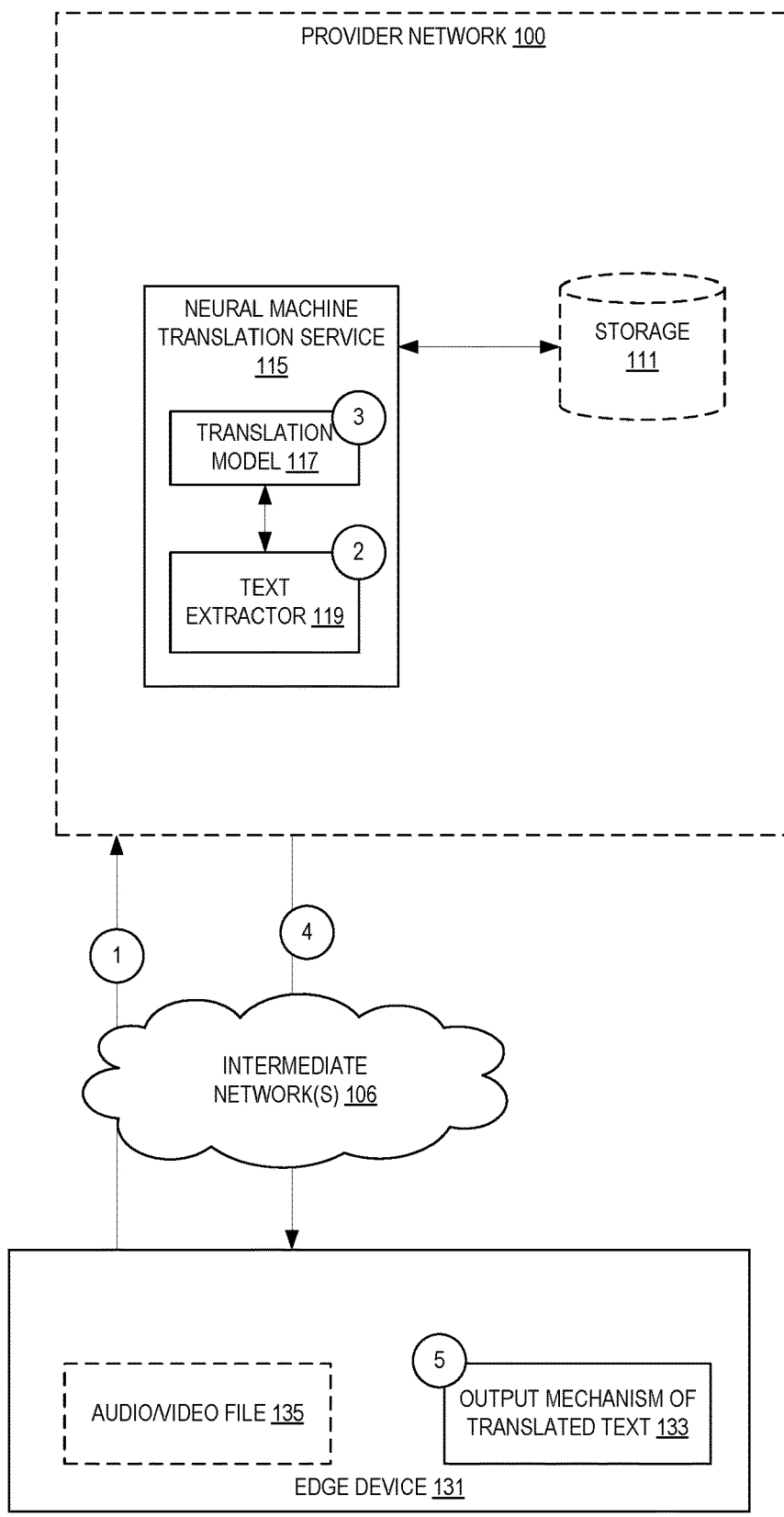
FIG. 2 illustrates embodiments of neural machine translation that controls an output length.

FIG. 2 illustrates embodiments of neural machine translation that controls an output length. The illustration of FIG. 2 is similar to that of FIG. 1, but in this example, the text extractor 119 is used. At circle 1, the edge device makes a request for a translation with controlled output length. Examples of what that request may include have been detailed above.

To make that translation the neural machine translation service 115 extracts the text from a source using text extractor 119. For example, closed captioning is pulled from a video file, or automatic speech recognition is performed on audio, etc. While not shown, the source may be found in storage 111. The neural machine translation service 115 uses a translation model 117 to make that translation according to the request at circle 3.

The result of the translation is sent back to the edge device at circle 4. Note the translation may also be stored in storage 111. For example, if the translation was for a public facing content (such as a movie of a content provider), that translation may be stored along with the original content so that a subsequent translation would not need to be made.

At circle 5, the translated text is output. For example, the translation is displayed, an audio version is played, etc.

Figure 3:
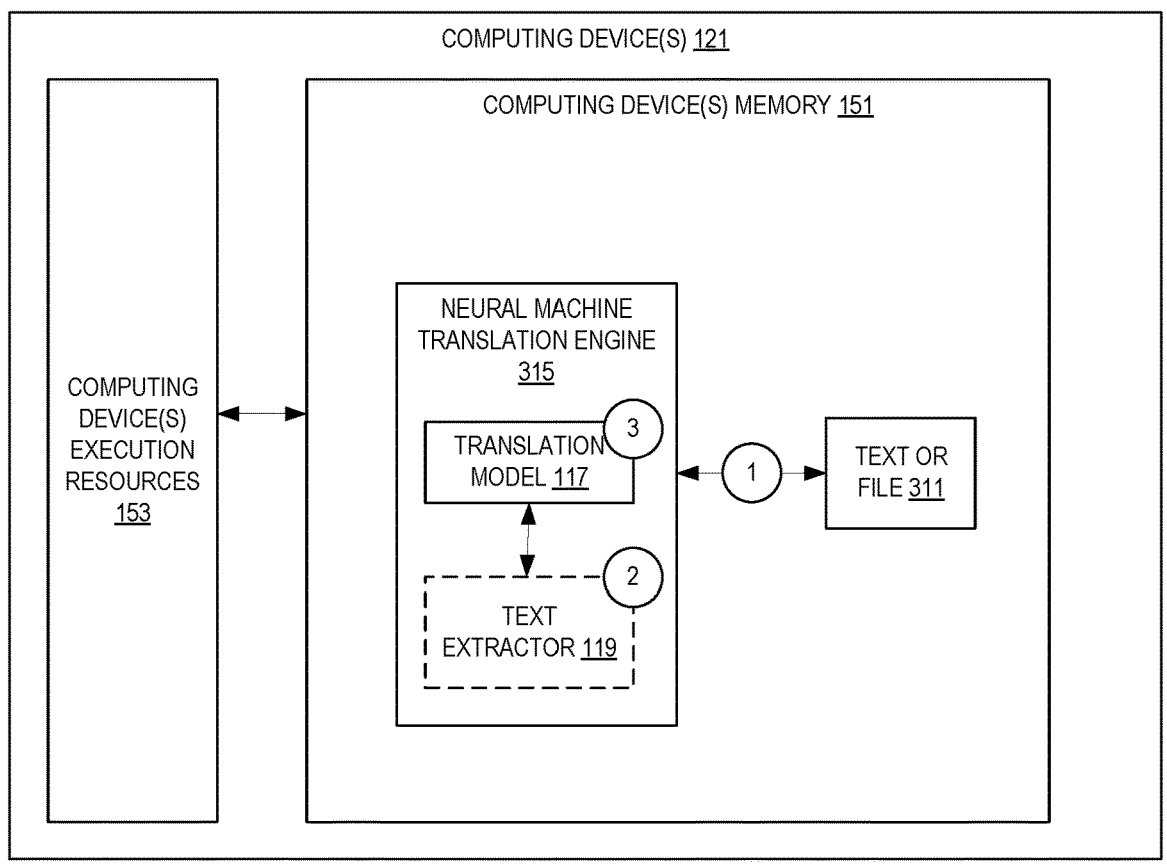
FIG. 3 illustrates embodiments of neural machine translation that controls an output length.

FIG. 3 illustrates embodiments of neural machine translation that controls an output length. In particular, FIG. 3 more specifically illustrates an example of neural machine translation in a more local fashion.

One or more computing devices 121 comprise computing device execution resources 153 (such as processors, accelerators, etc.) that execute software stored in computing device(s) memory 151 to provide a neural machine translation engine 315 that includes a translation model 117 and, in some embodiments, a text extractor 119. The memory 151 may also store text or a file 311 to be translated.

At circle 1, the text or file 311 is accessed by the neural machine translation engine 315 in response to a request for a translation with controlled output length. Examples of what that request may include have been detailed above.

To make that translation the neural machine translation engine 315 extracts the text from a source using text extractor 119. For example, closed captioning is pulled from a video file, or automatic speech recognition is performed on audio, etc. The neural machine translation service 115 uses a translation model 117 to make that translation according to the request at circle 3.

Figure 4:
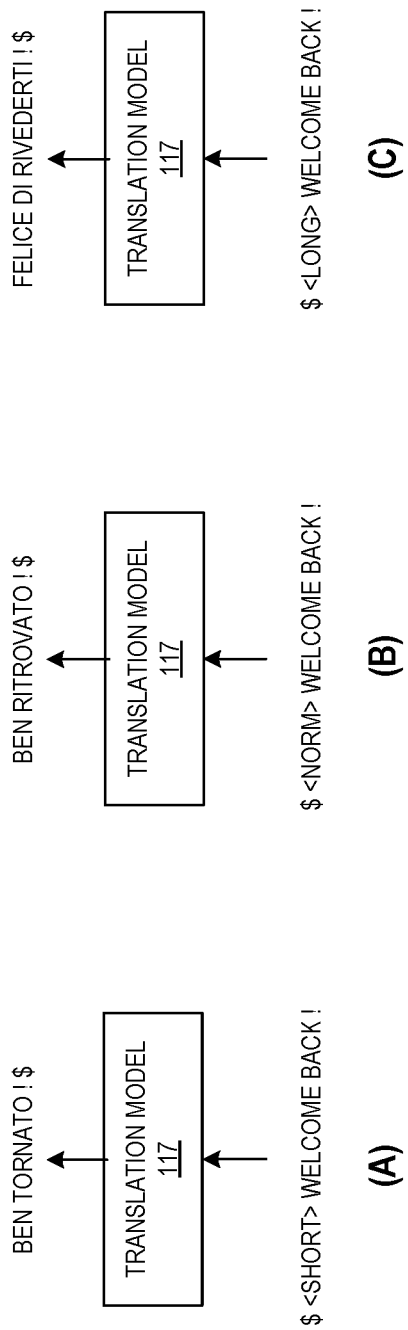
FIG. 4 illustrates examples of training a translation model using indications of a desired translation length.

FIG. 4 illustrates examples of training a translation model using indications of a desired translation length. In all of the examples the text to translate is "welcome back!". In particular, there are "short" length translations (an example shown in A), "normal" length translations (an example shown in B), and "long" length translations (an example shown in C). The translation model 117 is trained on these translation lengths.

As shown, the training sentence pairs are separated into three groups according to the target/source length ratio (in terms of characters). When the target is shorter than the source this is the "short" group, when the source and target are relatively equally sized this is the "normal" group, and the final group is when the target is longer than the source (the "long" group). In some embodiments, two thresholds of target minimum (tmin) and target maximum (tmax) are selected according to the length ratio distribution. All the sentence pairs with length ratio between tmin and tmax are in the normal group, those pairs with ratio below tmin are in the short group, and the remaining pairs are in the long group. At training time, a length token is pre-pended to each source sentence according to its group (<short>, <normal>, or <long>) as shown which allows a single network to discriminate between the groups. At inference time, the length token is used to bias the network to generate a translation that belongs to the desired length group. Of course, more granular groups may be used.

Figure 5:
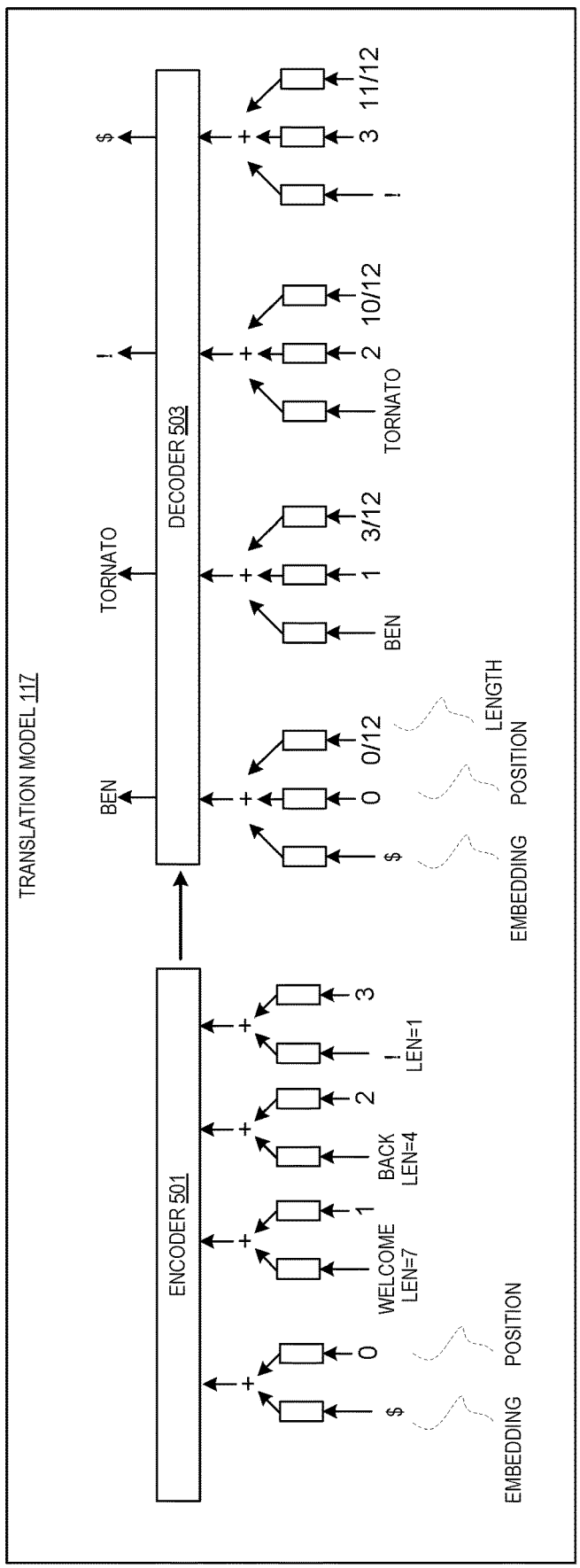
FIG. 5 illustrates embodiments of a model for performing neural machine translation with controlled output.

FIG. 5 illustrates embodiments of a model for performing neural machine translation with controlled output. Note that this translation model 117 may also have been trained according to the discussion of FIG. 4. In some embodiments, FIG. 5 is a more detailed representation of either the translation model of FIG. 4.

Within the encoder 501 or the decoder 503, each layer first computes attention between two copies of the same sequence ("self-attention"). In the decoder 503, this is followed by an attention over the encoder output sequence. The last step in each layer is a two-layered time-distributed feed-forward network, with a hidden size larger than its input and output. Attention and feed-forward layers are characterized by a position-invariant processing of their input.

The input to the encoder includes an input embedding summed with position encoding information. In some embodiments, the position encoding is $$PE(pos, 2i) = \sin\left(\frac{pos}{10000^{\frac{2i}{d}}}\right)$$

$$PE(pos, 2i+1) = \cos\left(\frac{pos}{10000^{\frac{2i+1}{d}}}\right)$$

where pos is the position, d is the embedding size in dimensions.

The input to the decoder includes an input embedding summed with position encoding information. To control the output length, an additional parameter regarding length (e.g., a length encoding) is input. In some embodiments, an absolute position with respect to the target length is the additional parameter. In other embodiments, the additional parameter is a relative position with respect to the target length. The absolute approach encodes the absolute position with respect to the target length:

$$LE_{abs}(len, pos, 2i) = \sin\left(\frac{len - pos}{10000^{\frac{2i}{d}}}\right)$$

$$LE_{abs}(len, pos, 2i+1) = \cos\left(\frac{len - pos}{10000^{\frac{2i+1}{d}}}\right)$$

where i=1, . . . , d2. Note that len is the character length of the sequence (end of the sequence) and pos is the character count of all the preceding tokens (a token position).

Similarly, the relative difference length encodes the relative position with respect to the desired length. This representation is made consistent with the absolute encoding by quantizing the space of the relative positions into a finite set of N integers:

$$LE_{rel}(len, pos, 2i) = \sin\left(\frac{qN(len/pos)}{10000^{\frac{2i}{d}}}\right)$$

$$LE_{rel}(len, pos, 2i+1) = \cos\left(\frac{qN(len/pos)}{10000^{\frac{2i+1}{d}}}\right)$$

where qN: [0,1]→{0, 1, . . . , N} is simply defined as qN(x)=⌈x×N⌉.

In the illustrated example, the input is $ Welcome Back! and the output is Ben Tomato! $. The $ indicates the beginning of an input and end of an output. As shown, Welcome Back! comprises 12 characters. As such, the output of the translation model 117 (the output of the decoder 503) should have a similar character count.

The input into the encoder 501 for each token (and the $) is the token itself and its position within the string. As such, $ is at position 0, Welcome is at position 1, etc. The token and position are mapped into distinct encoding and embedding vectors, respectively, that are summed together before being processed by the encoder network.

The input into the decoder 503 is, for each token, the token itself, the position of the token and the relative position (in characters) of token in the string. For example, after the $ value has been put through the decoder 503 the word "BEN" is output. The token BEN" is now an input into the next stage of the decoder along with its position in the string (1), and its relative position of 3/12 characters with respect to the desired output length of 12. As for the encoder, each information is mapped into distinct embedding and encoding vectors, respectively, which are summed together before being processed by the decoder network. This continues until all the string has been processed. Note the length of the previous token impacts what is left for subsequent tokens with respect to the total number of characters that is set as an approximate limit. Additionally, there may be times when a translation cannot fit within a requested length and a result that is closest to the requested length will be generated.

Figure 6:
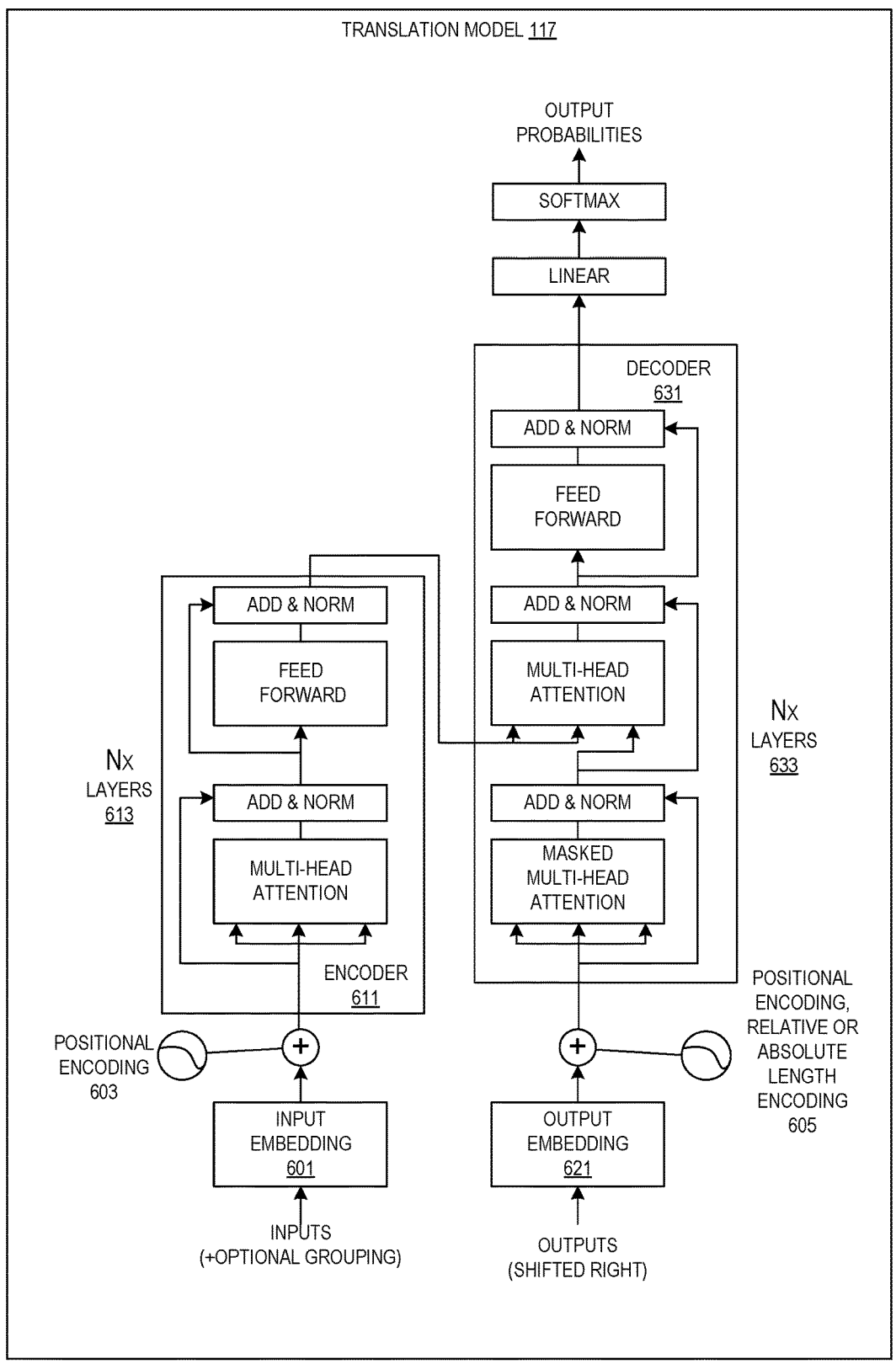
FIG. 6 illustrates embodiments of a model for performing neural machine translation with controlled output.

FIG. 6 illustrates embodiments of a model for performing neural machine translation with controlled output. Note that this model 117 may also have been trained according to the discussion of FIG. 4. In some embodiments, FIG. 6 is a more detailed representation of either the translation model of FIG. 4 or FIG. 5. In some embodiments, FIG. 6 illustrates a modified transformer architecture.

As shown, on the encoder side, an input embedding 601 is applied to inputs along with positional encoding and/or grouping information as noted above 603.

The encoder 611 is composed of a stack of N identical layers 613 with each layer having two sub-layers. The first sub-layer is a multi-head self-attention mechanism, and the second is a position-wise fully connected feed-forward network. A residual connection is around each of the two sub-layers, followed by layer normalization.

As shown, on the decoder side, an output embedding 621 is applied to shifted inputs along with positional encoding and length encoding as noted above 603.

The decoder 631 is also composed of a stack of identical layers 633. In addition to the two sub-layers in each encoder layer, the decoder 631 has a third sub-layer, which performs multi-head attention over the output of the encoder 611. Similar to the encoder 611, residual connections are around each of the sub-layers, followed by layer normalization. Note the first layer in the stack is masked to prevent positions to attend to subsequent positions. After the stack of identical layers, there is a linear transformation followed by an application of SoftMax.

Figure 7:
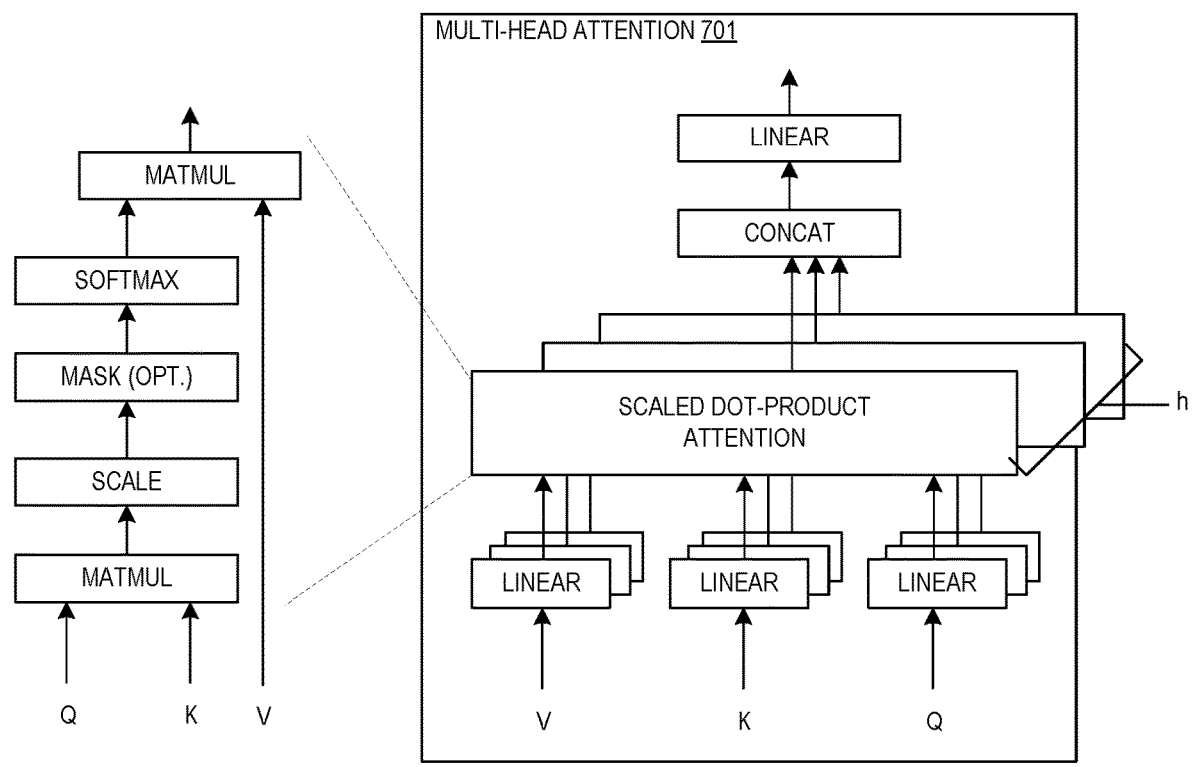
FIG. 7 illustrates embodiments of the multi-headed attention mechanism of the encoder and decoder.

FIG. 7 illustrates embodiments of the multi-headed attention mechanism of the encoder 611 and decoder 631. This example of multi-headed attention uses a "Scaled Dot-Product Attention" (highlighted on the left). The input of the scaled dot-product attention which is defined as:

$$Attention(Q, K, V) = softmax\left(\frac{QK^T}{\sqrt{dk}}\right)$$

Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence than Q. However, for the attention module that is considering the encoder and the decoder sequences, V is different from the sequence represented by Q.

The multi-head attention 701 divides the input vector into chunks and then the scalar dot-product attention is applied on each chunk in parallel. Finally, the average of all the chunk outputs is computed.

Figure 8:
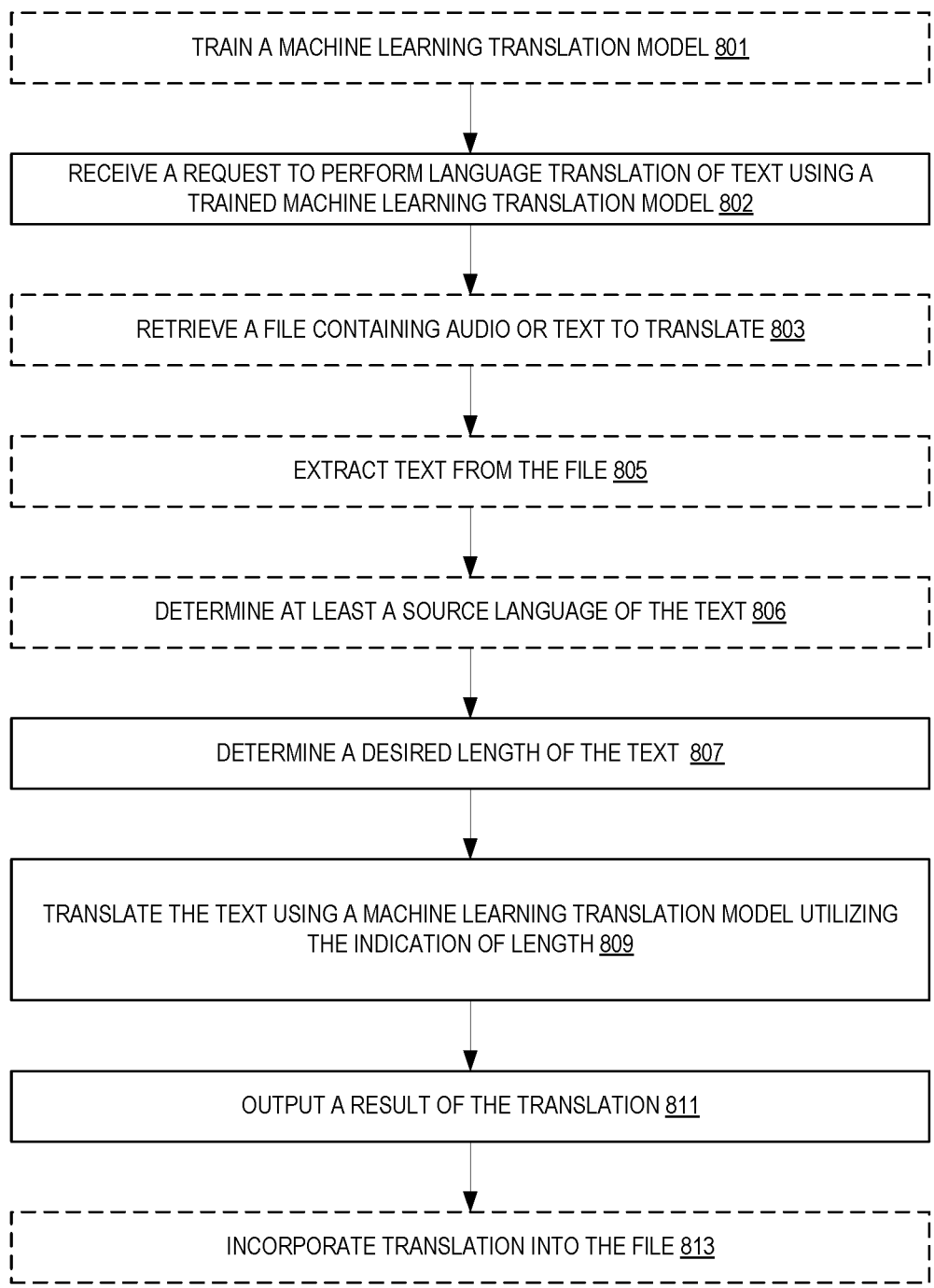
FIG. 8 is a flow diagram illustrating operations of a method for performing machine language translation with a controlled output according to some embodiments.

FIG. 8 is a flow diagram illustrating operations of a method for performing machine language translation with a controlled output according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the neural machine translation service 115 or neural machine translation engine 315 of the other figures.

In some embodiments, at 801, one or more machine learning translation models are trained. Examples of such training have been detailed above and include but are not limited to: training using absolute length encoding, training using relative length encoding, training using a plurality of length tokens and length encodings, and a combination thereof.

At 802, a request to perform language translation of text using a trained machine learning translation model is received. Examples of content of such requests have been detailed above.

Depending upon the content of the request, in some embodiments, a file is retrieved containing audio or text to translate at 803. For example, if the request points to such a file (and does not include the file), it will be retrieved.

When files are to be operated on, as opposed to given text, the text to be from the file is extracted at 805 in some embodiments. For example, closed caption is extracted from a video file, automatic speech recognition is performed on audio data, text is pulled from a word processing document, etc.

In some embodiments, a source language (or dialect) is determined from the text when the source language has not been provided at 806. This may be made by consulting a dictionary. For example, British English is different than American English and looking for variants in spelling may help determine which dialect is used. Similarly, differences between English and Italian would be readily apparent from consulting dictionaries for each respective language. In some embodiments, a target language (or dialect) is also determined. This determination may be based on a user identification, a user location, previous requests, etc.

At 807, for each sentence (or other breakdown), a determination of a desired overall length of the text is made in some embodiments. Typically, this determination is in a number of characters. Note in some embodiments, this length is provided with the request at 802.

The text is translated using a machine learning translation model that controls output length at 809. As noted above, controlling the output length may be based on using a length token, using a relative length encoding, using an absolute length encoding, or a combination of a length token and relative or absolute length encoding with respect to a desired output length. Note that in some embodiments, the translation model is a transformer-based model.

A result is output at 811. For example, the translated text is output. In some embodiments, an indication of which grouping was used is provided.

In some embodiments, the resulting output is incorporated into the file at 813. For example, closed captioning is replaced with new closed captioning, etc.

Figure 9:
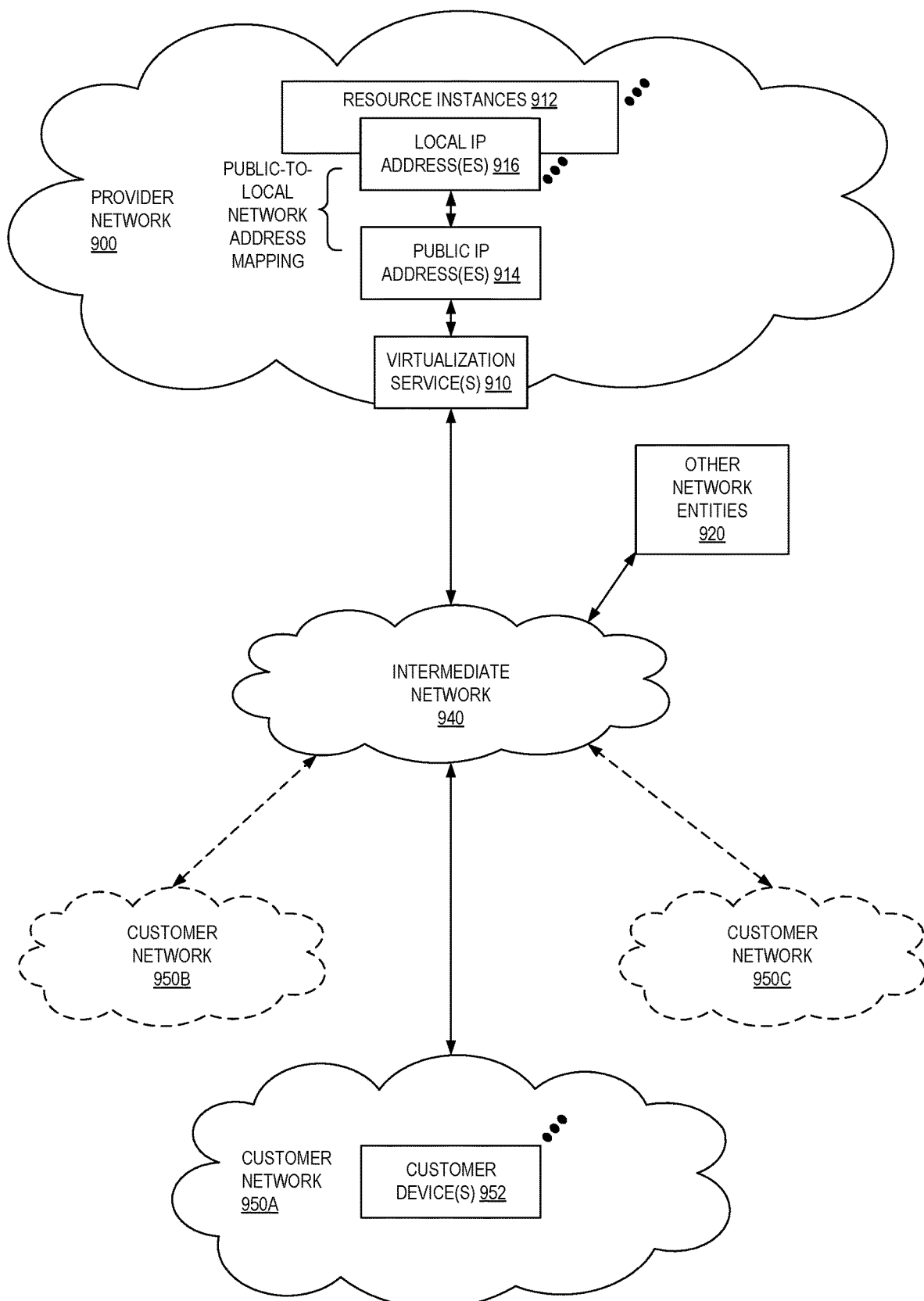
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
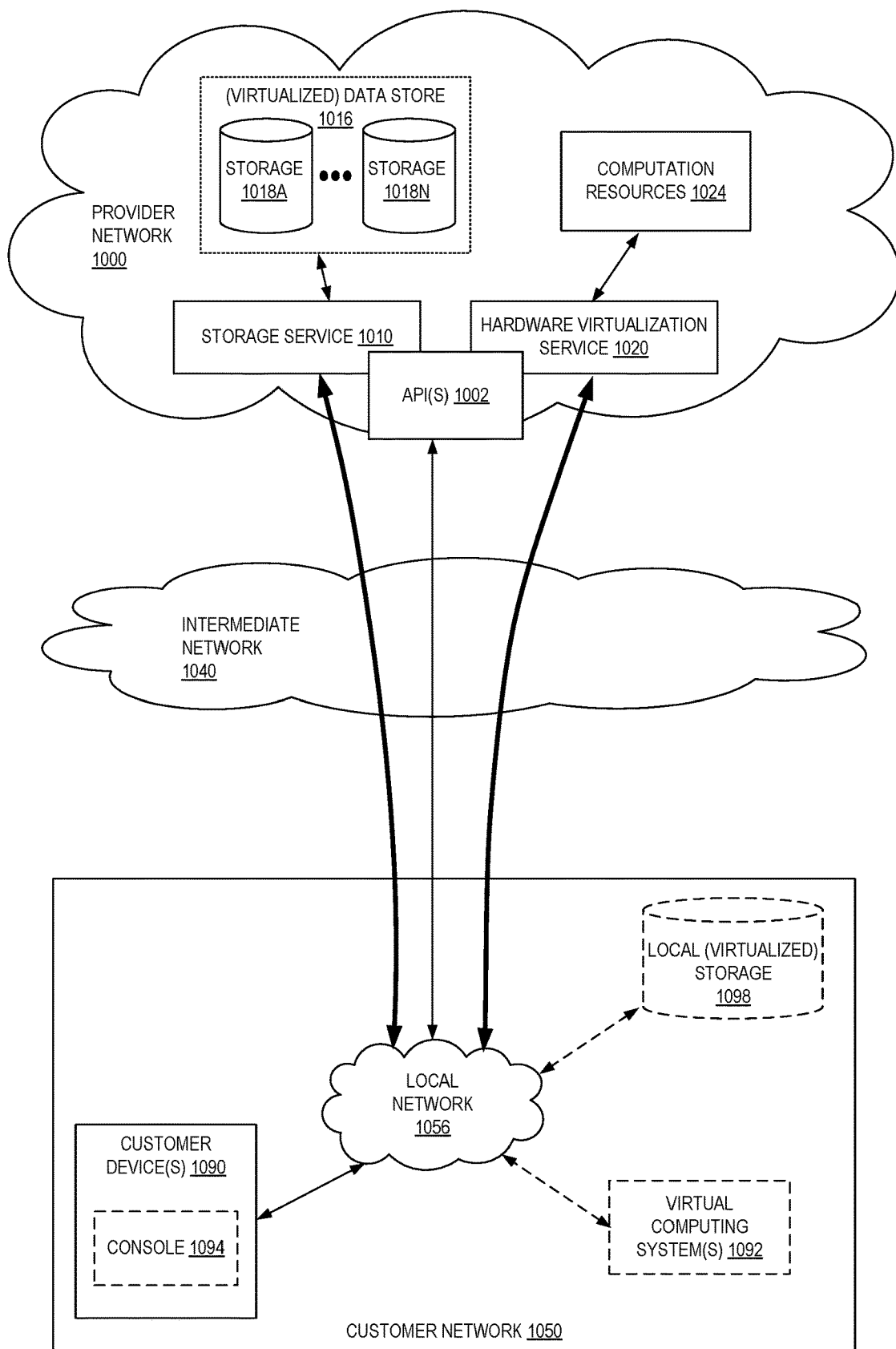
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
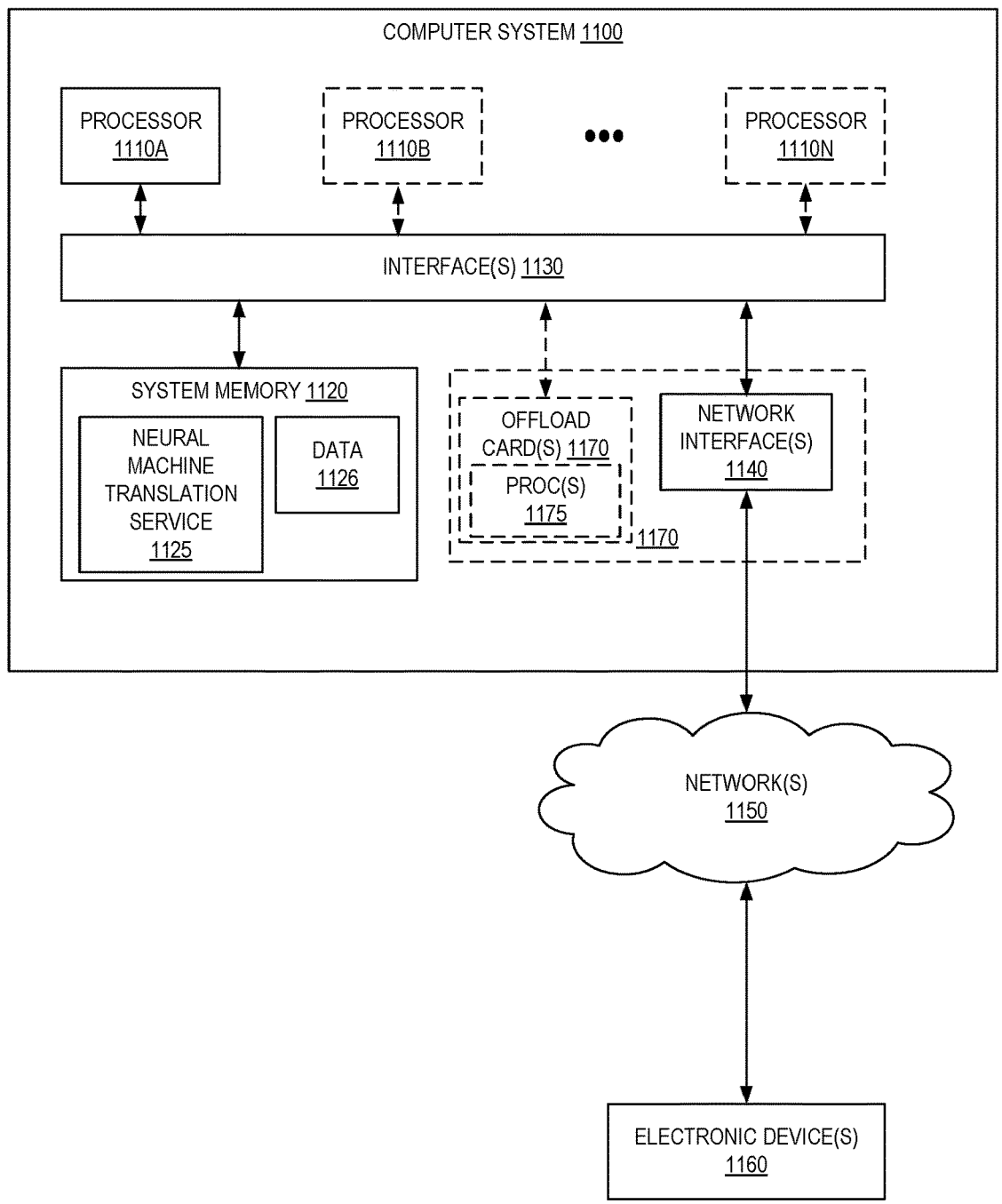
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as neural machine translation service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing, or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request from an edge device to perform a machine language translation of text supplied by the edge device using an identified translation model;
   determining a desired target length of the text;
   using the identified translation model to translate the text, the identified translation model including an encoder and decoder portion, the decoder portion accepts as an input into a decoder stack an embedding of a token of the text, a position of the token within the text, and a relative position of the token with respect to the desired target length of text; and
   outputting a result of the machine language translation to a requester.

2. The computer-implemented method of claim 1, wherein the relative position is based on a number of characters used per token and the desired target length based on a number of characters.

3. The computer-implemented method of claim 1, wherein the identified translation model comprises a plurality of identical encoder layers composed of an attention-based sub-layer followed by a first position-wise feedforward network, and a plurality of identical decoder layers composed of at least two attention-based sub-layers followed by a second position-wise feedforward network.

4. A computer-implemented method comprising:
   receiving a request to perform a machine language translation of text using a translation model;
   determining a desired target length of the text;
   using the translation model to translate the text, the translation model including an encoder and decoder portion, the decoder portion to accept as an input into a decoder stack at least an embedding of a token of the text, a position of the token within the text, and an indication of length; and
   outputting a result of the machine language translation to a requester.

5. The computer-implemented method of claim 4, wherein the indication of length is a relative length encoding of a relative position of a given token with respect to the desired target length.

6. The computer-implemented method of claim 4, wherein the indication of length is an absolute length encoding of an absolute position of a given token with respect to the desired target length.

7. The computer-implemented method of claim 4, wherein the translation model has been trained using a different length token for a plurality of groups of target/source ratios and the indication of length is a length token for a particular group of the plurality of groups of target/source ratios.

8. The computer-implemented method of claim 4, wherein the indication of length is one of a combination of two of relative length encoding, an absolute length encoding, and a length token for a particular target/source ratio.

9. The computer-implemented method of claim 4, wherein the text is closed captioning data extracted from an audio/video file.

10. The computer-implemented method of claim 4, wherein the translation model comprises a plurality of identical encoder layers composed of an attention-based sub-layer followed by a first position-wise feedforward network, and a plurality of identical decoder layers composed of at least two attention-based sub-layers followed by a second position-wise feedforward network.

11. The computer-implemented method of claim 4, wherein the text is generated by performing automatic speech recognition on audio data.

12. The computer-implemented method of claim 4, wherein the translation model is specific for a conversion from a particular source language to a particular target language and the request includes an identifier of the translation model.

13. The computer-implemented method of claim 4, wherein the method is performed on an edge device.

14. The computer-implemented method of claim 4, further comprising:
   performing an action in response to the outputted result of the machine language translation.

15. A system comprising:
   an edge device to provide text to be translated; and
   a neural machine translation service implemented by a second one or more electronic devices, the neural machine translation service including instructions that upon execution cause the neural machine translation service to:
      receive a request to perform a machine language translation of the provided text using a translation model;
      determine a desired target length of the text;
      using the translation model to translate the text, the translation model including an encoder and decoder portion, the decoder portion to accept as an input into a decoder stack at least an embedding of a token of the text, a position of the token within the text, and an indication of length; and
      output a result of the machine language translation to a requester.

16. The system of claim 15, wherein the indication of length is a relative length encoding of a relative position of a given token with respect to the desired target length.

17. The system of claim 15, wherein the indication of length is an absolute length encoding of an absolute position of a given token with respect to the desired target length.

18. The system of claim 15, wherein the translation model has been trained using a different length token for a plurality of groups of target/source ratios and the indication of length is a length token for a particular group of the plurality of groups of target/source ratios.

19. The system of claim 15, wherein the indication of length is one of a combination of two of relative length encoding, an absolute length encoding, and a length token for a particular target/source ratio.

20. The system of claim 15, wherein the translation model comprises a plurality of identical encoder layers composed of an attention-based sub-layer followed by a first position-wise feedforward network, and a plurality of identical decoder layers composed of at least two attention-based sub-layers followed by a second position-wise feedforward network.

* * * * *